(12) United States Patent
Melzer

(10) Patent No.: US 7,401,055 B2
(45) Date of Patent: Jul. 15, 2008

(54) SYSTEM AND METHOD FOR SETTING SPECIAL WHOLESALE PRICING FOR RESELLERS

(75) Inventor: Glenn W. Melzer, Sandy, UT (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 10/686,750

(22) Filed: Oct. 16, 2003

(65) Prior Publication Data

US 2005/0086181 A1 Apr. 21, 2005

(51) Int. Cl.
*G06Q 99/00* (2006.01)
(52) U.S. Cl. .............................. 705/400; 705/1; 705/26; 705/40
(58) Field of Classification Search ............... 705/26, 705/400, 1, 35, 40
See application file for complete search history.

(56) References Cited

U.S. PATENT DOCUMENTS

| | | | | |
|---|---|---|---|---|
| 4,549,750 | A | 10/1985 | Stone et al. | 283/79 |
| 4,750,119 | A | 6/1988 | Cohen et al. | 705/14 |
| 5,774,883 | A | 6/1998 | Andersen et al. | 705/38 |
| 5,878,400 | A * | 3/1999 | Carter, III | 705/20 |
| 6,266,651 | B1 | 7/2001 | Woolston | 705/27 |
| 6,401,080 | B1 * | 6/2002 | Bigus et al. | 705/37 |
| 6,553,350 | B2 | 4/2003 | Carter | 705/20 |
| 6,594,641 | B1 | 7/2003 | Southam | 705/26 |
| 2001/0049657 | A1 * | 12/2001 | Wang | 705/40 |
| 2002/0010643 | A1 * | 1/2002 | Chaves | 705/26 |
| 2002/0016779 | A1 * | 2/2002 | Roll et al. | 705/400 |
| 2002/0052831 | A1 | 5/2002 | Levy | 705/37 |
| 2002/0099622 | A1 * | 7/2002 | Langhammer | 705/26 |
| 2003/0033205 | A1 * | 2/2003 | Nowers et al. | 705/26 |
| 2003/0033215 | A1 * | 2/2003 | Habiby et al. | 705/26 |
| 2003/0046185 | A1 | 3/2003 | Levine | 705/26 |
| 2005/0080635 | A1 * | 4/2005 | Groff et al. | 705/1 |

FOREIGN PATENT DOCUMENTS

| | | | |
|---|---|---|---|
| GB | 2041874 A | | 9/1980 |
| JP | 09171531 A | * | 6/1997 |

(Continued)

OTHER PUBLICATIONS

Ouchiyama et al. ; "An E-shopping System with Different Negotiation Model", 2002 IEEE, Proceedings of the First International Symposium on Cyber Worlds (CW'02), 7 pgs.*

*Primary Examiner*—John W Hayes
*Assistant Examiner*—Freda A. Nelson
(74) *Attorney, Agent, or Firm*—Douglas A. Lashmit; Hoffman, Warnick & D'Alessandro LLC

(57) ABSTRACT

A system and method for calculating a special wholesale pricing between a wholesaler and a reseller for a transaction between the reseller and an end-user. A wholesale discount pricing system is provided that comprises: a system for inputting a special pricing request from a reseller, wherein the special pricing request includes a product identifier and an end-user discount the reseller intends on applying to the transaction with the end-user; a product mapping system that maps the product identifier to a set of pricing parameters; and a calculation system that calculates the special wholesale pricing based on the set of pricing parameters and the inputted end-user discount.

6 Claims, 2 Drawing Sheets

FOREIGN PATENT DOCUMENTS

| | | |
|---|---|---|
| JP | 2002007780 A | 1/2002 |
| JP | 2002259723 A | 9/2002 |
| KR | 2002008329 | 1/2002 |
| KR | 2002008329 A | 1/2002 |
| WO | WO0191002 A2 | 1/2002 |

* cited by examiner

SYSTEM AND METHOD FOR SETTING SPECIAL WHOLESALE PRICING FOR RESELLERS

BACKGROUND OF THE INVENTION

1. Technical Field

The present invention relates generally to pricing systems, and more specifically relates to a system and method for automatically setting pricing for resellers requesting a special price from a wholesaler.

2. Related Art

It is typical for wholesalers (e.g., manufacturers and distributors) to sell products to an intermediary who in turn resells the product(s) to the final end user. Often a contractual agreement exists between the wholesaler and the reseller defining what discount off of published list prices the reseller will receive when purchasing products from the wholesaler. This is known as the wholesale discount. For example, a wholesaler may give a reseller a 40% wholesale discount for a product having a published list price of $1000, i.e., $600. The reseller is then free to set the product price to their end users. If the reseller is unable to establish a price that is both agreeable to the end user and profitable to the reseller, and the particular transaction is important enough, it may be in the best interest of the reseller and the wholesaler to negotiate a "special wholesale pricing" for the transaction. For instance, instead of the usual 40% wholesale discount, the wholesaler may provide a special discount pricing of 45%, i.e., $550.

Before offering a special wholesale price, the wholesaler will typically consider: the size of the transaction, how much additional discount off of the existing wholesale discount is needed, what effect this price will have on future transactions, whether the reseller is being completely honest in their representation of the situation, etc. The negotiation of a special wholesale pricing for a unique transaction can be a laborious and time-consuming process. If not set properly, the special wholesale pricing may not be economically advantageous to the manufacturer. If the wholesale price setting is a common activity, maintaining price consistency can be difficult. Inconsistent or haphazard special wholesale prices can frustrate and damage the working relationship between the manufacturer and reseller.

Accordingly, a need exists for an automated system and method for setting special wholesale pricing when requested by a reseller.

SUMMARY OF THE INVENTION

The present invention addresses the above-mentioned problems, as well as others, by providing an automated system and method for establishing rational special wholesales pricing to resellers. The invention ensures that the special wholesale pricing is economically advantageous to the wholesaler and the reduced profit margins associated with a lower price are shared between the wholesaler and the reseller. This sharing of reduced profit margins ensures that the wholesaler and reseller have a shared incentive to avoid excessive discounting. In addition, the system and method motivates the reseller to effectively communicate the value of the products being offered so the end user will desire to purchase the product without requiring an excessive discount.

The invention allows the reseller to request a special wholesale pricing from a wholesaler using a standard format, thereby allowing the process to be automated. Data that must be provided by the reseller to the wholesaler includes: (1) the identification of the specific product requiring special pricing; (2) the list price of that product; and (3) the end user discount that the reseller will use to establish the end user price. The logic of the invention processes the request using a standard methodology and determines a special wholesale discount that is communicated back to the reseller.

In a first aspect, the invention provides a wholesale discount pricing system for calculating a special wholesale pricing between a wholesaler and a reseller for a transaction between the reseller and an end-user, comprising: a system for inputting a special pricing request from a reseller, wherein the special pricing request includes a product identifier and an end-user discount that the reseller intends on applying to the transaction with the end-user; a product mapping system that maps the product identifier to a set of pricing parameters; and a calculation system that calculates the special wholesale pricing based on the set of pricing parameters and the inputted end-user discount.

In a second aspect, the invention provides a program product stored on a recordable medium for calculating a special wholesale pricing between a wholesaler and a reseller for a transaction between the reseller and an end-user, comprising: means for inputting a special pricing request from a reseller, wherein the special pricing request includes a product identifier and an end-user discount that the reseller intends on applying to the transaction with the end-user; means for selecting a set of pricing parameters based on the product identifier; and means for calculating the special wholesale pricing based on the set of pricing parameters and the inputted end-user discount.

In a third aspect, the invention provides a method for calculating a special wholesale pricing between a wholesaler and a reseller for a transaction between the reseller and an end-user, comprising: receiving a special pricing request in a standard format from a reseller; determining a set of pricing parameters for the transaction; and calculating the special wholesale pricing based on the set of pricing parameters.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
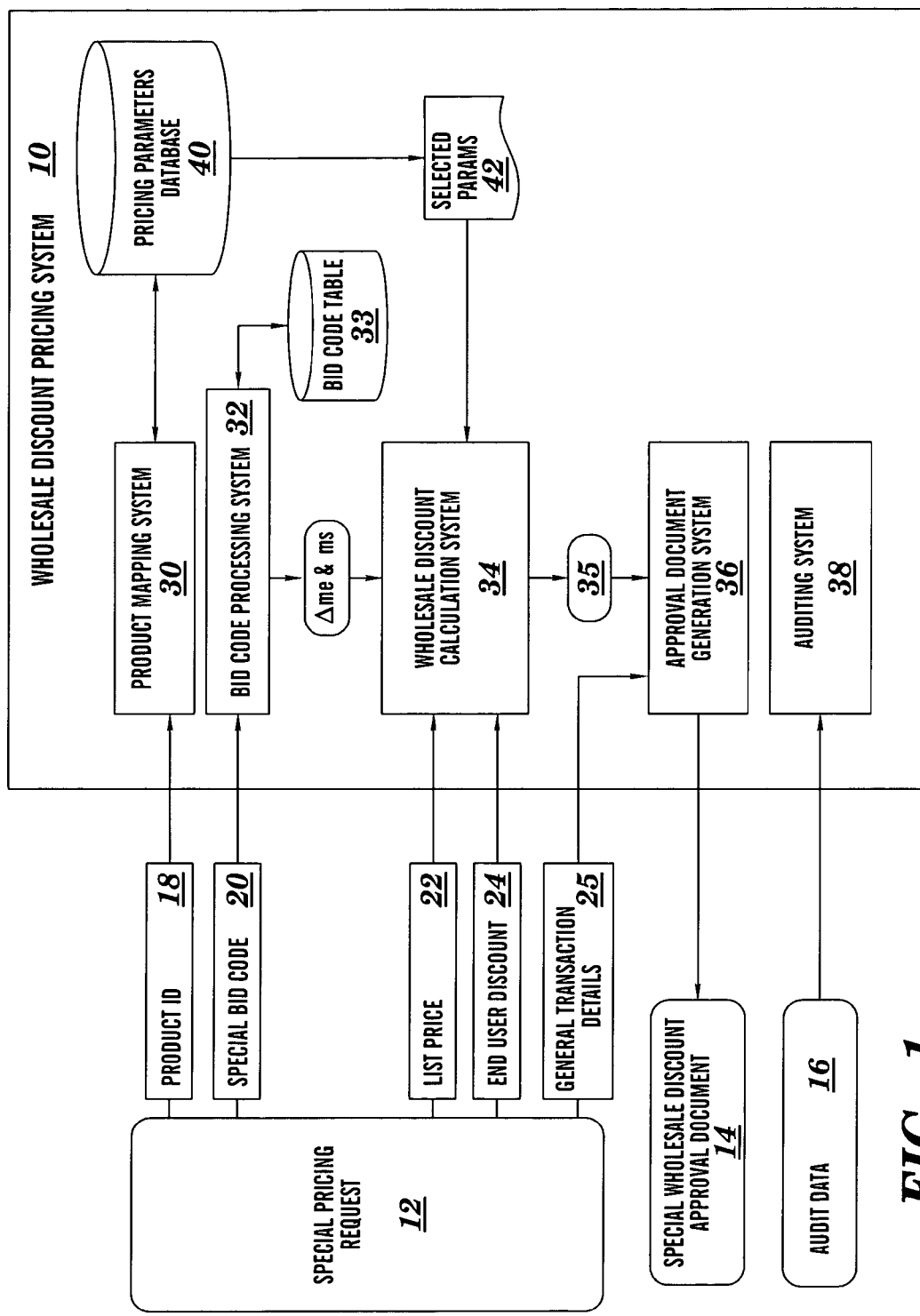
FIG. 1 depicts a wholesale discount pricing system in accordance with the present invention.

Referring now to the drawings, FIG. 1 depicts a wholesale discount pricing system 10 that receives a special pricing request 12 from a reseller, and if approved, generates a special wholesale discount approval document 14 back to the reseller. After the reseller's transaction with an end-user, audit data 16 can be submitted back to wholesale discount pricing system 10 to ensure that the reseller abided by the terms and conditions of the special wholesale discount approval document 14. Wholesale discount pricing system 10 can be implemented, e.g., over a network, such as the world wide web (Web), the Internet, an intranet, etc.; as a stand-alone software product; as a service from a service provider; in distributed manner; manually; etc.

As noted above, the process begins by a reseller inputting special pricing request 12. The special pricing request 12 may for instance be entered via a web page. Each special pricing request 12 submitted by a reseller generally includes a product ID 18, a list price 22 for the product, and an end-user discount 24, e.g., the percentage off the list price at which the reseller wants to sell the product to the end-user. Thus, for example, the reseller may input a product ID 18="XYZ-123," a list price 22="$1000," and the end-user discount 24="30%" (for an end-user cost of $700).

In addition, special pricing request 12 may also include a special bid code 20. The special bid code 20 is used, for example, in instances where the reseller may incur additional selling expenses for certain types of transactions. For example, selling to a customer who has never used the product before may require greater than normal sales efforts and associated sales expenses. In these cases, the wholesaler may want to compensate the reseller by providing a greater than normal wholesale discount. This process is automated with the use of a special bid code 20 and bid code processing system 32. Namely, when a special bid code 20 is specified to the wholesaler in the special pricing request 12, the reseller's gross profit margin may be increased by approving a greater wholesale discount than would be given without the special bid code 12. This process is described in further detail below.

Finally, the special pricing request 12 will typically include general transaction details 25. General transaction details 25 may include any additional information pertinent to the transaction. Examples may include, e.g., the name of the reseller, the name of the end-user, request dates, location information, transaction name, etc. General transaction details 25 can be used by approval document generation system 36 (described below) to generate an approval document 14 for the request 12.

When a special pricing request 12 is submitted, the product ID 18 is inputted to a product mapping system 30, which maps the product ID to a unique set of pricing parameters. Pricing parameters database 40 may be utilized to store sets of pricing parameters for all possible product ID's. Pricing parameters for each product are established by the wholesaler based on some criteria, e.g., product characteristics, market assumptions, economic theories, data mining, historical information, etc. In one exemplary embodiment, the product mapping system 30 can first map the product ID to a product group. Each product group may represent a plurality of related products that have similar characteristics, such that each related product requires the same pricing parameters. Once the product group is established, the pricing parameters for the group can be obtained from pricing parameters database 40 and forwarded to wholesale discount calculation system 34.

Pricing parameters are utilized to define a pricing curve that dictates whether a special wholesale pricing should be approved, and if so, how much. Pricing parameters may be stored, e.g., in a table of row entries containing the following data elements:

(1) Product Group Name—This is a unique name representing a group of products that would be treated in the same way, (2) De=Entitled Discount (described below), (3) Dm=Maximum Discount (described below), (4) Ms=Start Margin (described below), (5) Me=End Margin (described below), (6) Minimum List Price Threshold—This parameter is used to deny any special price request that does not exceed this extended list price threshold. Its purpose is to ensure that the transaction is large enough to justify a special price, and (7) Assign to Pricer Margin Threshold—This parameter is used to assign the request to an individual for special treatment when the reseller's gross profit margin (Mr) is below this threshold. Its purpose is for special handling of those requests that would require very deep discounts.

In addition to the selected pricing parameters 42, wholesale discount calculation system 34 inputs the list price 22 and end user discount 24 from the special pricing request 12 submitted by the reseller. Using this information, wholesale discount calculation system 34 calculates a special wholesale pricing 35, in accordance with the methodology described below with reference to FIG. 2.

Moreover, if a special bid code 20 is provided, bid code processing system 32 can submit to wholesale discount calculation system 34 a revised start margin Ms and/or a revised end margin Me. The wholesaler can define any number of special bid codes, which specify the following to the reseller:

(1) Special Bid Code ID—For example, this could be a simple three or four digit number.

(2) Description of When It Can Be Used—This describes the marketing situation that must exist for the code to be used.

(3) Terms and Conditions of the Special Bid Code—This describes the legal terms and conditions that must be accepted by the reseller when the special bid code is used.

(4) Audit Standards That Will Be Applied—This describes what documentation or other source materials (i.e., audit data 16) must be provided by the reseller to the wholesaler if the wholesaler requests an audit. The audit data can be requested by the wholesaler to ensure that the reseller was qualified to use the special bid code per the Terms and Conditions.

Each of the special bid codes may be stored in a bid code table 33 having row entries, with each row containing the following data elements:

(1) Special Bid Code ID—This is the identifier specified by the reseller to the wholesaler;

(2) Special Bid Code Description—A simple description of the purpose of the special bid code; and (3) Margin Adjustment—The margin adjustment given when the special bid code is used.

It should be recognized that special bid codes 20 can be used for any purpose to handle deviations to the normal wholesale discount pricing process.

Once a special wholesale price 35 for the transaction is determined by wholesale discount calculation system 34, the price must be communicated to the reseller. Approval document generation system 36 is utilized to create and send a special wholesale discount approval document 14 back to the requesting reseller. Information contained in the approval document 14 may be derived, e.g., from the general transaction details 25 inputted as part of the special pricing request 12, from calculations made within the pricing system 10 (e.g., the approved pricing), from a local database that contains existing information about the reseller or end-user (i.e., existing contracts), etc. The approval document 14 may for example contain the following:

(1) Description of the Transaction—This documents the customer situation as requested by the reseller and ensures that there is no confusion about what transaction this special pricing applies to. Items in the description may include: Reseller name, approval date, a unique special pricing ID, special pricing expiration date, end user name, end user location, and transaction name given by the requestor;

(2) Legal Terms and Conditions—These add to or amend whatever standard terms and conditions may already exist between the wholesaler and the reseller; and (3) Approved Discounts—This documents the details of the special price approval. It includes the product specific product IDs, the normal reseller entitled discount for the product, the end user discount the reseller has decided to use, and the approved special wholesale discount.

Finally, after the transaction is finalized between the reseller and the end-user, audit data 16 may be sent back to an auditing system 38 by the reseller to ensure that the reseller abided by the terms of the approval document 14.

As noted above, wholesale discount calculation system 34 provides an automated methodology for determining the special wholesale pricing based on the selected pricing parameters 42 and pricing information inputted by the reseller. The methodology is based on the creation of a price curve 50, such as that shown in the chart depicted in FIG. 2. The price curve 50 is defined by four parameters:

(1) De=Entitled Discount (The normal wholesale discount to the reseller);

(2) Dm=Maximum Discount (The maximum discount the wholesaler is willing to approve for special circumstances through this process);

(3) Ms=Start Margin (The reseller's implicit gross profit margin, below which the wholesaler is willing to approve additional discount above the Entitled Discount); and (4) Me=End Margin (The reseller's implicit gross profit margin at which the wholesaler will have reached the Maximum Discount).

Figure 2:
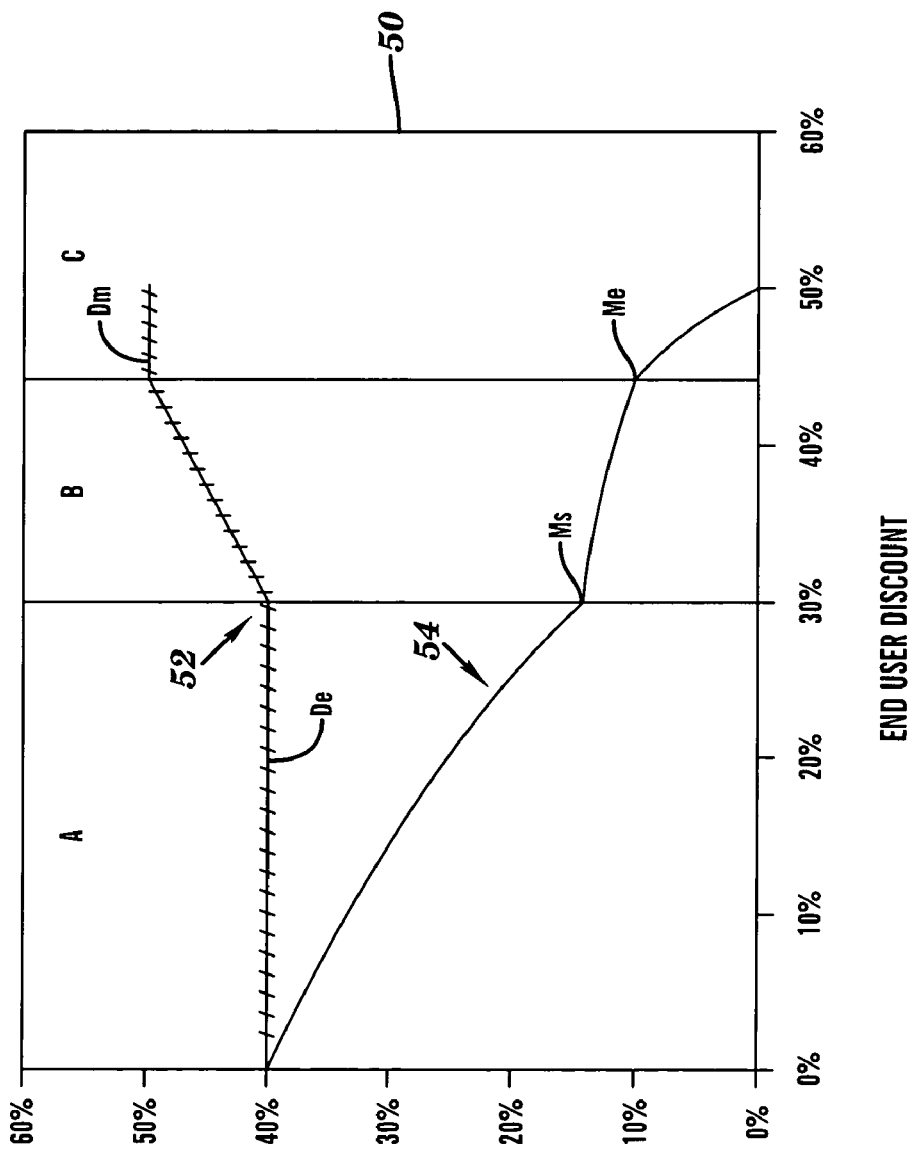
FIG. 2 depicts an exemplary wholesale discount pricing curve in accordance with the present invention.

The chart depicted in FIG. 2 uses the following parameters: De=40%; Dm=50%; Ms=15%; Me=10%. The upper curve shows what discount 52 the wholesaler is willing to approve as a function of the end-user discount set by the reseller. In this example, the Entitled Discount (De) is 40%. If the reseller uses a 0% end-user discount, the reseller would earn a 40% gross profit margin. As the end-user discount increases, the gross profit margin 54 decreases as shown on the lower curve in FIG. 2. At some end-user discount, the gross profit margin 54 reaches the Start Margin (Ms) of 15%. This is the point where the wholesaler is willing to subsidize the transaction by increasing the wholesale discount 52. The wholesale discount 52 will continue to increase as the end-user discount increases until the Maximum Discount (Dm) of 50% is reached. At the point where the Maximum Discount (Dm) is initially reached, the reseller gross profit margin 54 will equal the End Margin (Me) of 10%. As the reseller's end user discount increases beyond this point, the wholesale discount 52 remains at the Maximum Discount (Dm) and therefore the reseller gross profit margin 54 would decline until it reaches zero.

The wholesale discount and the reseller margin functions are related by the following formulas and therefore the formulas can be used to move from one line to the other:

Dw=Approved Wholesale Discount
Mr=Reseller Gross Profit Margin
Deu=End User Discount $$Mr = 1 - \frac{(1-Dw)}{(1-Deu)} \qquad (1)$$

or $$Dw = Deu + Mr - (Deu \times Mr) \qquad (2)$$

The wholesale discount curve can be divided into three segments, A, B and C. The function of the discount curve may be implemented with a software program, with segments A, B and C being implemented in three different routines. In the first segment A, the wholesale discount 52 remains constant and is equal to the Entitled Discount (De). In the second segment B, the wholesale discount 52 increases with increasing end-user discount. In the third segment C, the wholesale discount 52 remains constant and is equal to the Maximum Discount (Dm). The transition between these segments occur at specific end-user discounts defined as follows:

Deus=End User Discount at Start Margin
Deue=End User Discount at End Margin $$Deus = \frac{(De - Ms)}{(1 - Ms)} \qquad (3)$$

$$Deue = \frac{(Dm - Me)}{(1 - Me)} \qquad (4)$$

The reseller margins are uniquely defined for each segment:

Segment A (for end user discounts less than Deus):

$$Mr = 1 - \frac{(1-De)}{(1-Deu)} \qquad (5)$$

Segment B (for end user discounts between Deus and Deue):

$$Mr = m \times Deu + b \qquad (6)$$

Where:

$$m = \frac{(Ms - Me)}{(Deus - Deue)} \qquad (7)$$

$$b = Ms - m \times Deus \qquad (8)$$

Segment C (for end user discounts greater than Deue):

$$Mr = 1 - \frac{(1-Dm)}{(1-Deu)} \qquad (9)$$

Once the margin (Mr) is determined, formula (2) can be used to convert the results into the equivalent wholesale discount (Dw), which is communicated to the reseller.

When a special bid code 20 is used, it affects the reseller margin of segment B and therefore requires that the Ms and Me parameters be changed using the following formulas:

Ma=Margin Adjustment $$b1 = b + Ma \qquad (10)$$

$$Deus = \frac{((1+m-b1) - SQRT((m-b1+1)^\wedge 2 + 4 \times m \times (b1 - De)))}{2 \times m} \qquad (11)$$

$$Deus = \frac{((1+m-b1) - SQRT((m-b1+1)^\wedge 2 + 4 \times m \times (b1 - Dm)))}{2 \times m} \qquad (11)$$

$$Ms = m \times Deus + b1 \qquad (12)$$

$$Me = m \times Deue + b1 \qquad (13)$$

EXAMPLE

Consider the following wherein De=40%; Dm=50%; Ms=15%; and Me=10%. Using the above formulas, $Deus=(0.4-0.15)/(1-0.15)=0.29412$ $Deue=(0.5-0.1)/(1-0.1)=0.44444$ $m=(0.15-0.1)/(0.29412-0.44444)=-\mathbf{0.33262}$ $b=0.15-(-0.33262\times0.29412)=0.24783$ Assume a margin adjustment (Ma)=3% based on a special bid code, then $b1=0.24783+0.03=0.27783$ $Deus=((1-0.33262-0.27783)-SQRT((-0.33262-0.27783+1)\char`\^2+4(-0.33262)(0.27783-0.4)))/2(-0.33262)=0.25715$ $Deus=((1-0.33262-0.27783)-SQRT((-0.33262-0.27783+1)\char`\^2+4(-0.33262)(0.27783-0.5)))/2(-0.33262)=0.41983$ $Ms=-0.33262\times0.25715+0.27783=0.19230$ $Me=-0.33262\times0.44444+0.27783=0.13000.$ If Deu=20% (segment A because it is less than Deus), then $Mr=1-(1-0.4)/(1-0.2)=0.25$ $Dw=0.2+0.25-(0.2\times0.25)=0.4.$ This resulted in a discount (Dw) no greater than their normal 40% reseller discount. If Deu=35% (segment B because it is between Deus and Deue), then $Mr=0.33262\times0.35+0.27783=0.16141$ $Dw=0.35+0.16141-(0.35\times0.16141)=0.45492.$ This resulted in over 5% additional discount to the reseller. If Deu=45% (segment C because Deu is greater than Deue), then $Mr=1-(1-0.5)/(1-0.45)=0.09091$ $Dw=0.45+0.09091-(0.45\times0.09091)=0.50000.$ This resulted in the maximum discount to the reseller of 50%.

Process Overview

The process for requesting and receiving special pricing is defined so those involved understand their roles. In a typical scenario, a contractual relationship may already exists between the wholesaler and the reseller describing the terms and conditions of their business transactions. The following steps are used:

(1) The reseller determines the need for special pricing;

(2) The reseller inputs a special pricing request in a standard format and communicates it to the wholesale discount pricing system (e.g., via the WEB);

(3) The wholesale discount pricing system receives the request;

(4) The wholesale discount pricing system tests the request for input errors (e.g., checks for valid product IDs, etc.);

(5) The wholesale discount pricing system uses automated algorithms to determine special pricing;

(6) The wholesale discount pricing system generates Approval Documentation and transmits response back to reseller;

(7) The reseller uses special pricing if they elect to do so;

(8) The wholesaler reviews the transaction and any audit data to ensure that the reseller complied with the terms and conditions.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system "having a processor, memory, input device, and output device" with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computerized method for calculating a special wholesale pricing between a wholesaler and a reseller for a transaction between the reseller and an end-user, comprising:

providing at least one processing unit and a memory operably associated with the at least one processing unit; and a wholesale pricing system storable in memory which when executed by the at least one processing unit provides functions including:

receiving a special pricing request in a standard format from a reseller, wherein the special pricing request includes a product identifier and an end-user discount that the reseller intends on applying to the transaction with the end-user;

determining a set of pricing perimeters for the transaction, wherein the set of pricing parameters includes an entitled discount, a maximum discount, a start margin and an end margin;

calculating the special wholesale pricing based on the set of pricing parameters, wherein the calculating includes:

a first routine for handling a case where the end-user discount is less than the start Margin;

a second routine for handling a case where the end-user discount is greater than the start margin, but less than the end margin; and a third routine for handling a case where the end-user discount is greater than the end margin;

wherein the end-user discount at the start margin is given by: (De−Ms)/(1 Ms), wherein De is the entitled discount and Ms is the start margin; and outputting the special wholesale pricing.

2. The method of claim 1 wherein the special pricing request includes a product identifier and an end-user discount the reseller intends on applying to the transaction with the end-user.

3. The method of claim 1 comprising the further steps of:
   receiving a special bid code with the special pricing request;
   mapping the special bid code to a margin adjustment; and
   generating a revised start margin and end margin based on the margin adjustment.

4. The method of claim 2 comprising the further steps of:
   generating an approval document; and
   transmitting the approval document back to the reseller.

5. The method of claim 1 comprising the further step of receiving audit data from the reseller to ensure compliance with the approval document.

6. A computerized method for calculating a special wholesale pricing between a wholesaler and a reseller for a transaction between the reseller and an end-user, comprising:
   providing at least one processing unit and a memory operably associated with the at least one processing unit; and
   a wholesale pricing system storable in memory which when executed by the at least one processing unit provides functions including:
   receiving a special pricing request in a standard format from a reseller, wherein the special pricing request includes a product identifier and an end-user discount that the reseller intends on applying to the transaction with the end-user;
   determining a set of pricing parameters for the transaction, wherein the set of pricing parameters includes an entitled discount, a maximum discount, a start margin and an end margin;
   calculating the special wholesale pricing based on the set of pricing parameters, wherein the calculating includes:
      a first routine for handling a case where the end-user discount is less than the start Margin;
      a second routine for handling a case where the end-user discount is greater than the start margin, but less than the end margin; and
      a third routine for handling a case where the end-user discount is greater than the end margin;
      wherein the end-user discount at the start margin is given by: $(D_e-M_s)/(1\ M_s)$, wherein $D_e$ is the entitled discount and $M_s$ is the start margin; and outputting the special wholesale pricing.

* * * * *